United States Patent
Kober et al.

(10) Patent No.: US 11,649,792 B2
(45) Date of Patent: *May 16, 2023

(54) SNOW BIKE INTAKE

(71) Applicants: Reinhold E. Kober, Burley, ID (US); Johnn William Hieb, Meridian, ID (US)

(72) Inventors: Reinhold E. Kober, Burley, ID (US); Johnn William Hieb, Meridian, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 17/562,957

(22) Filed: Dec. 27, 2021

(65) Prior Publication Data

US 2022/0120246 A1   Apr. 21, 2022

Related U.S. Application Data

(63) Continuation of application No. 16/686,068, filed on Nov. 15, 2019, now Pat. No. 11,242,828.

(51) Int. Cl.

| *F02M 35/10* | (2006.01) |
| *F02M 35/16* | (2006.01) |
| *B60K 13/02* | (2006.01) |

(52) U.S. Cl.
CPC ........... *F02M 35/10373* (2013.01); *F02M 35/10144* (2013.01); *F02M 35/162* (2013.01); *B60K 13/02* (2013.01); *F02M 35/10013* (2013.01)

(58) Field of Classification Search
CPC ....... F02M 35/10373; F02M 35/10144; F02M 35/162; F02M 35/10013; F02M 35/1038; F02M 35/10386; F02M 35/10393; F02M 35/10091; B60K 13/02

See application file for complete search history.

(56) References Cited

U.S. PATENT DOCUMENTS

| 6,240,911 B1 | 6/2001 | Patrick |
| 6,287,354 B1 | 9/2001 | Nozaki |
| 6,314,931 B1 | 11/2001 | Yasuda et al. |
| 7,353,899 B2 | 4/2008 | Abe et al. |
| 8,080,078 B2 | 12/2011 | Zbiral et al. |
| 8,151,765 B2 | 4/2012 | Nagao et al. |
| 11,242,828 B2* | 2/2022 | Kober .............. F02M 35/10144 |
| 2005/0051375 A1 | 3/2005 | Momosaki |

(Continued)

FOREIGN PATENT DOCUMENTS

EP        1066462 B1     1/2002

*Primary Examiner* — Jacob M Amick
(74) *Attorney, Agent, or Firm* — Jason P. Webb; Pearson Butler (57) ABSTRACT

A snow bike intake, snow bike conversion kit, and/or air intake pod snow bike conversion kit, having: a throttle body coupling; an elbow-shaped intake duct coupled to the throttle body, a pre-filter body cage coupled at a rear thereof to the duct, and a textile cover fitting about the cage. The duct has an interior angle between 40 and 60 degrees. There are a plurality of flat (interior and exterior surface) sensor mounts disposed about and through the duct, including an octagonal ring of sensor mounts circumscribing the duct body. The cage has a flat front opposite the rear that has a larger diameter than a diameter of the rear. The duct has an aspect ratio of exterior angle length to diameter no greater than 3.5:1 and the duct and prefilter combined has an aspect ratio of exterior angle length to diameter no greater than 4.5:1.

20 Claims, 10 Drawing Sheets

(56) References Cited

U.S. PATENT DOCUMENTS

| | | | |
|---|---|---|---|
| 2008/0110098 A1* | 5/2008 | Frederick | F02M 35/10013 55/385.3 |
| 2009/0218152 A1 | 9/2009 | Oohashi et al. | |
| 2014/0008136 A1 | 1/2014 | Bennett | |
| 2017/0106942 A1 | 4/2017 | Hasegawa et al. | |
| 2017/0130683 A1 | 5/2017 | Somerville | |
| 2017/0260938 A1* | 9/2017 | Williams | F02M 35/048 |

* cited by examiner

SNOW BIKE INTAKE

CROSS-REFERENCE TO RELATED APPLICATIONS

This invention claims priority as a continuation application, under 35 U.S.C. § 120 to the U.S. Non-provisional patent application Ser. No. 16/686,068 by Kober et al., which is incorporated by reference herein in its entirety.

BACKGROUND OF THE INVENTION

Field of the Invention

The present invention relates to air intake systems for vehicles, specifically intakes for snow bikes.

DESCRIPTION OF THE RELATED ART

Air intake systems for motorized vehicles provide a flow of air into the motor for combustion. Such systems generally include inlets, filters, and manifolds that receive, condition, and channel the air into the motor in a manner that provides adequate air volume into the motor and protects the motor from foreign materials. Air intake systems sometimes include sensors (e.g. O2, mass airflow) and/or injectors (e.g. Nitrous Oxide).

Various conditions can make it difficult for air intake systems to properly perform their function. Accordingly, intake accessories, intake system modifications, and modified intake systems have been developed in order to address such issues. Some examples include: problems with moisture condensation within the air intake system causing water to pass through the throttle body and into the motor, problems for all-terrain vehicles traveling through bodies of water wherein the air intake is at a vertical level that would be below the level of water when the vehicle is partially submerged, and problems with duct seals failing and thereby air filtration is circumvented.

In the related art, it has been known to modify motorized dirt bikes to adapt them for use in snow/wet conditions and/or to produce motorized bikes that are specifically adapted for use in snow/wet conditions.

One of the primary snow/wet modifications that is done to a dirt bike includes one or more modifications to the intake system of the dirt bike. Where no modification is made, a dirt bike will generally accumulate snow, mud, and moisture in the intake housing where the air inlet of the motor resides. While mud and water may accumulate in the intake housing in warmer conditions, mud and water have much higher densities and flow much better and therefore mud/water that is flipped up into the intake housing (aka airbox) tends to flow right back out, generally leaving residue, but most of the time that residue is not an issue. However, snow will stick and pack into the intake housing chamber and can choke out the inlet, thereby starving the motor of the air it needs to function properly. This can also cause moisture within an air filter to freeze and that can choke out the motor as well. Therefore, performance will decrease over time as a dirt bike is used in snow conditions unless the user spends time cleaning out the intake housing chamber.

Accordingly, there are intake accessories that are generally added after-market to dirt bikes that convert them to snow bikes. Some riders try and seal their air box to prevent snow from accumulating but this can fail and can also result in lower air volume. It can also create conditions where liquid water accumulates in the air box, which can cause other problems. Others remove the airbox entirely (or significant portions thereof) in order to try and allow the snow to more easily and quickly fall out of the area around the inlet. One type of intake accessory, called simply an "intake" or sometimes called a "pod" or "snorkel intake" includes an extender that extends the inlet aperture away from the wall of the intake housing chamber (sometimes extending all the way out of the airbox itself) and also generally includes a simple filter (pre-filter) that keeps snow from entering the intake and thereby protecting the inlet from the snow. By effectively raising the inlet aperture away from the wall of the intake housing chamber, where snow is more likely to pack, the intake protects the air intake system of the bike from the accumulating snow and reduces the frequency that a user must stop and clean out the snow from the intake housing chamber.

Some improvements have been made in the field. Examples of references related to the present invention are described below in their own words, and the supporting teachings of each reference are incorporated by reference herein:

U.S. Pat. No. 8,151,765, issued to Nagao et al., discloses an air cleaner and downstream sides of throttle valves in throttle bodies provided in intake passages are connected by bypass passages. An idle speed control apparatus provided at a midpoint of the passage controls amounts of air supplied during an idling operation. End portions of the bypass passages connected to the throttle bodies are located in higher positions than end portions of the bypass passages connected to the air cleaner so that the bypass passages are inclined downward toward the air cleaner. As a result, water is prevented from blocking the bypass passages via a simple structure.

U.S. Pat. No. 8,080,078, issued to Zbiral et al., discloses an anti-snow module designed for installation into an air filter housing includes a support plate configured for support in the housing. A partition is provided for mourning into the interior of the housing of the air filter. A valve plate is configured to seals [sic] the housing of the air filter below a predetermined differential pressure existing between the interior of the housing of the air filter behind the valve plate and the exterior of the housing of the air filter and open when the differential pressure exceeds a predetermined differential pressure value. At least one guide rail is provided on which the valve plate is slideably supported by at least one guide sleeve provided on the valve plate.

U.S. Pat. No. 7,353,899, issued to Abe et al., discloses an improved snowmobile component layout structure includes an engine provided at front portion of the vehicle body, a cylinder head of the engine is inclined by an angle θ rearwards from a vertical axis, a steering shaft extends forwardly of the engine, and an air intake system, including an air cleaner, is provided at the rear side of the engine. In addition, a rider seat is provided on the rear side of the engine, and an elongated fuel tank is provided below the seat. The air cleaner has an improved disposition between the fuel tank and the engine. The inventive configuration narrows the spacing between an engine and a rider and concentrates mass to enhance turning [sic] performance.

U.S. Pat. No. 6,314,931, issued to Yasuda, discloses a snorkel duct including a main body portion extended forwardly from an air cleaner in an oblique upper direction with a substantially uniform cross sectional area and a bent portion bending at a front end portion thereof. An air inlet is provided at a front end of the bent portion and is opened at a position where water, dust or the like is difficult to invade. A main opening portion opened in a lower direction is provided at a portion of the main body portion at a vicinity of the bent portion and a smaller drain hole is opened on a lower side thereof An expansion chamber is attached to a side of the main body portion in order to cover the main opening portion and the drain hole, and the cross sectional area of the main body portion is rapidly enlarged at the main opening portion to thereby reduce air-flow resistance, prevent pulsation sounds from being generated, and to silence intake noise.

The inventions heretofore known suffer from a number of disadvantages which include fitting only a single or a small variety of bike intake systems, requiring modification to a dirt bike before installation when converting a dirt bike to a snow bike, requiring cutting/excising portions of an intake housing prior to installation, failing to allow a bike to intake sufficient air during wet and/or snow conditions, being difficult to install, making it difficult to install sensors and/or injectors into the intake system of a bike, failing to mate properly with installed sensors and/or injectors and their associated mounts, only permitting sensor/injector mounting at a limited angular range of deployment about the circumference of an intake, not allowing for multiple sensors and/or injectors to be mounted on an intake, and/or failing to improve air volume into an intake system.

What is needed is a snow bike intake, snow bike conversion kit, and/or air intake pod that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available intake systems. Accordingly, the present invention has been developed to provide a snow bike intake, snow bike conversion kit, and/or air intake pod.

According to one embodiment, there is a snow bike intake, snow bike conversion kit, and/or air intake pod snow bike conversion kit, that includes one or more of the following: a throttle body coupling; a coupling device; an intake duct that may be elbow-shaped and/or may be selectably coupleable to the throttle body coupling via the coupling device, the duct may have an interior angle between 40 and 60 degrees; a pre-filter body cage that may be selectably coupleable at a rear thereof to the duet via a mating structures disposed on the duct and the cage; and/or a textile cover that may be shaped to fit about the cage and selectably attach thereto.

It may be that the duct includes a sensor mount disposed through a body of the duct. It may be that the sensor mount is flat on both the exterior and interior surfaces thereof. It may be that the sensor mount is part of an array of sensor mounts disposed in a ring circumscribing and extending through the body of the duct. It may be that the array of sensors forms a continuous regular polygon about the perimeter of the duct.

It may be that the mating structures are selected from the group of mating structures consisting of: threading, friction fittings, spring-locks, and locking-lug connectors.

It may be that the cage has a flat front opposite the rear. It may be that the flat front of the cage has a larger diameter than a diameter of the rear.

It may be that the duct has an aspect ratio of exterior angle length to diameter no greater than 3.5:1. It may be that the duct and prefilter combined has an aspect ratio of exterior angle length to diameter no greater than 4.5:1.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment f the present invention. Thus, discussion of the features and, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that illustrated in the appended drawing(s). It is noted that the drawings of the invention are not to scale. The drawings are mere schematics representations, not intended to portray specific parameters of the invention. Understanding that these drawings) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIGS. 1-4 illustrate a snow bike intake, according to one embodiment of the invention. There is shown an intake duct 20. Disposed about a circumference of the intake duct 20 are an array of sensor mounts 22. The intake duct 20 also includes a sensor mount 24 that is separate from the array of sensor mounts 22 disposed along a length of the intake duct 20 at a side of the elbow thereof. In addition, the illustrated intake duct 20 includes a throttle body coupling 30, with a coupling device 32, the throttle body coupling 30 disposed along an end portion of the intake duct 20. Disposed along at end portion opposite the throttle body coupling 30 is a prefilter body cage 40 with a front of cage 42 and a coupling collar 44.

The illustrated intake duct 20 is elbow-shaped, wherein the duct 20 has a bend or crook near a middle portion of the intake duct 20. The illustrated duct 20 has a bend of approximately 45 degrees, measured as the angular difference 94 from a straight line between the linear axis 93 of a first region of the elbow as compared to the linear axis 92 of a second region of the elbow (see FIG. 4). However, the elbow of the duct 20 may include a bend of a different, such as, but not limited to having a bend of between about two or more of: 40, 41, 42, 43, 44, 45, 46, 47, 48, 49, 50, 51, 52, 53, 54, 55, 56, 57, 58, 59, and 60 degrees. It has been observed that optimal configuration utility during installation with respect to varieties of air boxes occurs at these angles.

The elbow of the duct 20 advantageously allows for asymmetric positioning of the large cage 40, wherein rotation of the duct with respect to the throttle body causes the cage 40 to be placed in different locations within the air box and/or air box region (e.g. wherein the air box is removed) when installed. As many dirt bikes have small air boxes with substantially different configurations from each other, this allows for the installer to more easily fit a single snow bike intake model into a greater variety of dirt bikes without having to modify their respective air boxes. Accordingly, manufacturing costs are reduced as fewer models need to be molded and produced. Further, it also allows for a larger cage, which results in greater performance of the intake.

As illustrated, the intake duct 20 includes an array of sensor mounts 22 and a sensor mount 24. A throttle bottle coupling 30 is coupled to one end of the duct 20 with coupling device 32. A prefilter body cage 40 having a flat front 42 is coupled to the other end of the duct 20 via a coupling collar 44. As a result, the intake duct 20 may couple to a vehicle, such as a snow bike, for providing oxygen to a combustion engine. The intake duct 20 may also sense and/or filter the oxygen it provides and/or inject materials into the intake air stream through one or more sensors/injectors mounted to the body of the intake duct at the sensor mounts 22 and/or 24.

As shown, the illustrated array of sensor mounts 22 is disposed substantially around a circumference of a middle portion of the intake duct 20 and substantially near the throttle body coupling 30. The array of sensor mounts 22 may be configured to mount a variety of sensors, such as, but not limited to: oxygen saturation sensors, condensation sensors, humidity sensors, temperature sensors, dew point sensors, pressure sensors, mass airflow sensors, and so on. Further, injectors may be mounted on the sensor mounts, such as but not limited to anti-detonant injectors (ADI) and oxygen injectors (e.g. Nitrous Oxide). The illustrated sensor mounts 22, 24 provide a diversity of mounting positions (e.g. lateral positions along the length of the duct, radial positions about the circumference of the duct) and orientations (e.g. angular orientations about the circumference of the duct). As a result, a variety of sensors/injectors may be coupled to the array of sensor mounts 22 even where the dirt bike air box is small or cramped with the snow bike intake installed.

While particular positions, shapes, and numbers of sensor mounts are illustrated, the array of sensor mounts 22 may have a great variety in size, shape, diameter, etc, for mounting sensors to the intake duct 20. The sensor mounts will generally include parallel flat surfaces (internal to the duct and external to the duct) to which the sensor/injector mounts and will be of a material that may be easily drilling/punched so that the installer can drill/punch a hole therethrough through which the sensor/injector can extend, thereby having access to the interior of the duct. For instance, the duct 20 may have a polygonal (e.g. irregular, hexagon, pentagon, square)-array of flat regions for the sensor mounts. Likewise, sensor mounts may be hexagonal (or other shaped)

mount points, as compared to the illustrated rectangular mounts of the illustrated array 22 or the ovoid shapes of the separate mount 24. More, the array of sensor mounts may include any number of mounts for mounting sensors, such as, but not limited to, 4-8 mounts. Additionally, the array of sensor mounts may not be equally spaced or sized, and there may be an array with different sizes and different number in different regions within the same array.

The illustrated sensor mount 24 is disposed along a side portion of the length of the intake duct 20 and near the throttle body coupling 30, though further from the throttle body coupling than the illustrated array of sensor mounts 22. The sensor mount 24 may be configured to mount a variety of sensors/injectors, such as, but not limited to: oxygen saturation sensors, condensation sensors, humidity sensors, temperature sensors, dew point sensors, water injector, nitrous injector, and so on. Hence, a plethora of sensors may be coupled to the sensor mount 24. The illustrated sensor includes markings/depressions on the face thereof that provide guide locations for drilling/punching mounting holes and/or sensor holes through which screws, rivets, pins, etc. and sensor elements may extend through the duct. The sensor mount 24 may also have any size and/or shape for mounting sensors to the intake duct 20. For example, the sensor mount 24 may be hexagon-shaped and/or substantially flat.

As shown, the illustrated intake duct 20 also includes a throttle body coupling 30 disposed substantially along an end portion of the intake duct 20. The throttle body coupling 30 may be configured to couple the intake duct 20 to a throttle of a bike. The illustrated throttle body coupling 30 is a rubber/elastic material (generally a fiber composite for strength) that is friction fit about the mount of the duct and sized to mate with standard/custom throttle body mouths. For instance, the throttle body coupling 30 may couple the intake duct 20 to a throttle by threading, friction-fit, bolting, adhesion, and so on. Accordingly, the throttle body coupling 30 may have any size, shape, diameter, circumference, etc. for coupling the intake duct 20 to a throttle.

The illustrated throttle body coupling 30 has a coupling device 32. The coupling device 32 is shown disposed around a circumference of the throttle body coupling 30. The coupling device 32, may be tightened by twisting a handle, such as a vice or a ring clamp. The coupling device 32 may include a bolt for tightening. As a result, an effective diameter of the coupling device 32 may be increased and decreased. For example, the diameter of the coupling device 32 may be decreased in order to couple the throttle body coupling 30 to the intake duct 20 by tension-fit or may be increased to allow for the throttle body coupling to be removed or repositioned from/on the duct.

Also shown, the illustrated intake duct 20 includes a prefilter body cage 40 disposed along an end portion of the intake duct 20 opposite the throttle body coupling 30. The prefilter body cage 40 aids in the collection and filtration of air as it enters the intake duct 20, allowing air to pass therethrough but providing a physical barrier to snow/ice/etc. As illustrated, the prefilter body cage 40 flares out to a wider diameter than the duct and has a flat wide front and short length as compared to the duct. However, the prefilter body cage 40 may have variation in size and/or shape from that illustrated for collecting and/or filtering air and preventing water penetration.

The illustrated prefilter body cage 40 includes a front of cage 42 and a coupling collar 44. As shown, the front of cage 42 is configured with a grid of bars/barriers with open spaces between to allow air to be received by the prefilter body cage 40 and into the intake duct 20, while providing cage-like structure to help in preventing water penetration and to support any textile filter coupled thereto. As illustrated, the front of cage 42 is substantially flat and wide, having a similar width/diameter to that of the flared out cage. The cage 42 may flare out to create a large surface area; however, smaller flaring allows for greater angle variation on the intake duct 20. The front of cage 42 is substantially flat and may be gently bowed/textured in or out instead of exactly flat, so long as the shape of the front does not cause the cage to be elongated at the front. The sharp cut-off in length at the front provides a better ratio of performance to size for the snow bike intake and makes it much easier for a single model to fit into a great variety of dirt bike air boxes. The illustrated front of cage 42 is also grid-like and has apertures for movement of air and prevention of water intake.

As illustrated, the coupling collar 44 couples the prefilter body cage 40 to the intake duct 20. For instance, the coupling collar 44 may couple the prefilter body cage 40 to the intake duct 20 by threading. However, the coupling collar 44 may include a variety of coupling mechanisms, such as, but not limited to: adhesives, bolts, friction, tension, male and female components, snapping, pressing, spring-locks, locking-lug connectors, etc. The coupling mechanisms of the coupling collar may allow for selective coupling and decoupling of the cage 40 to the duct 20.

Figure 4:
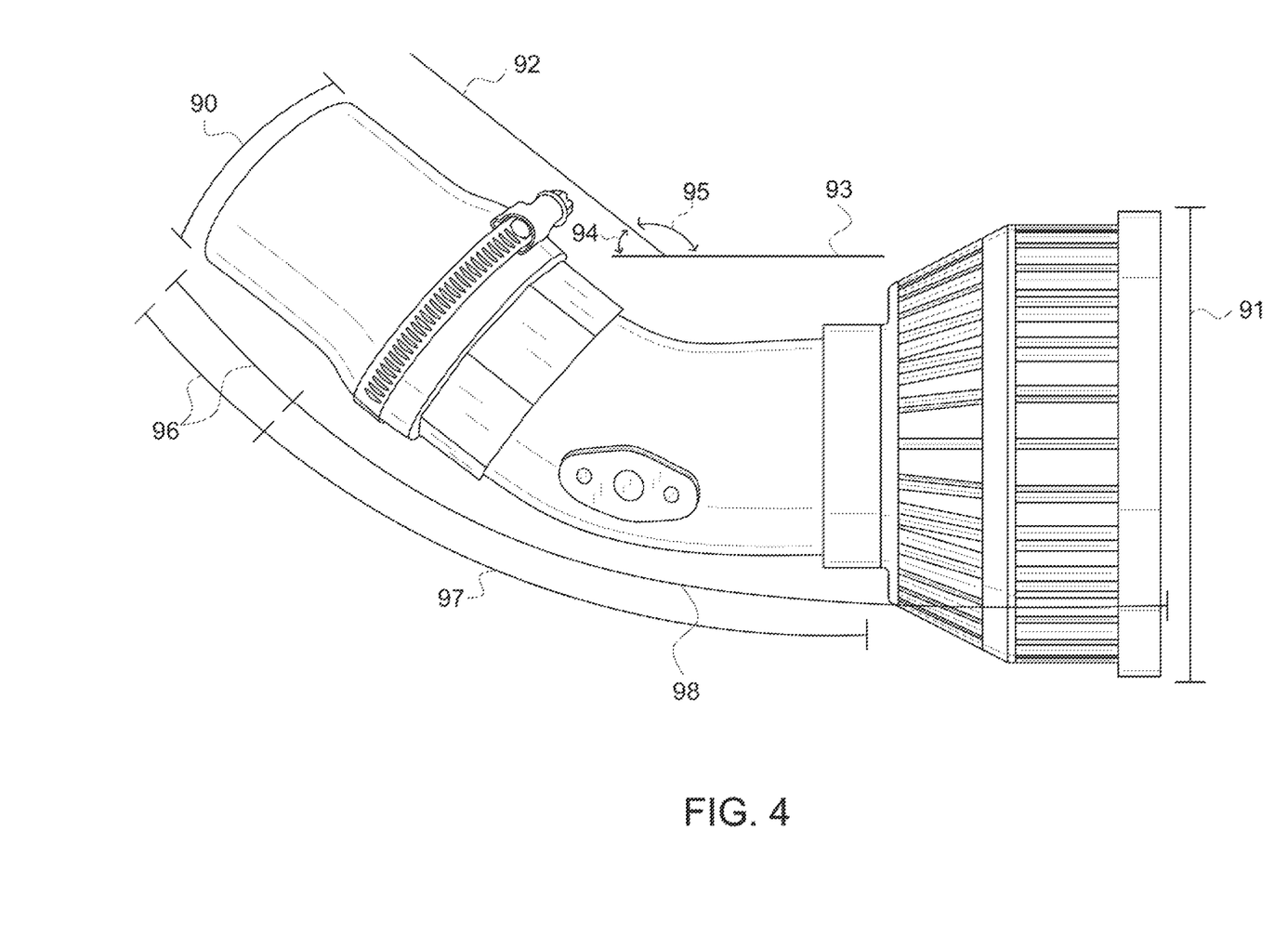
FIG. 4 is a side elevational view of a snow bike intake, according to one embodiment of the invention.

Looking to FIG. 4, there is illustrated a snow bike intake having illustration markings to illustrate various measurements of angle and length discussed herein, according to one embodiment of the invention. As shown, there is a diameter of duct 90 and diameter of cage 91, wherein the diameter of the duct is smaller than the diameter of the cage and therefore the cage is flared out with respect to the duct. There is also illustrated a throttle line 92 and an intake line 93, which are parallel to axis lines of the first and second portions of the duct defined as the straight regions of the duct on either side of the elbow thereof. An interior angle 94 and an exterior angle 95 are formed by an intersection of the throttle line 92 and the intake line 93. The illustrated interior angle 94, which may be referred to as the angle of the elbow, is approximately 45 degrees. The illustrated snow bike intake also has a throttle body connector length 96, a duct length 97, and a duct plus cage length 98.

The illustrated diameter of duct 90 provides an opening, similar to a hose. As a result, the diameter of duct 90 allows air to flow through the intake duct (See e.g., FIG. 1, Item 20) and into a combustion engine of a snow bike. The illustrated diameter of cage 91 also provides an opening to allow air to enter into the intake duct (See e.g., FIG. 1, item 20). As shown, the diameter of cage 91 is greater than the diameter of duct 90.

Figure 1:
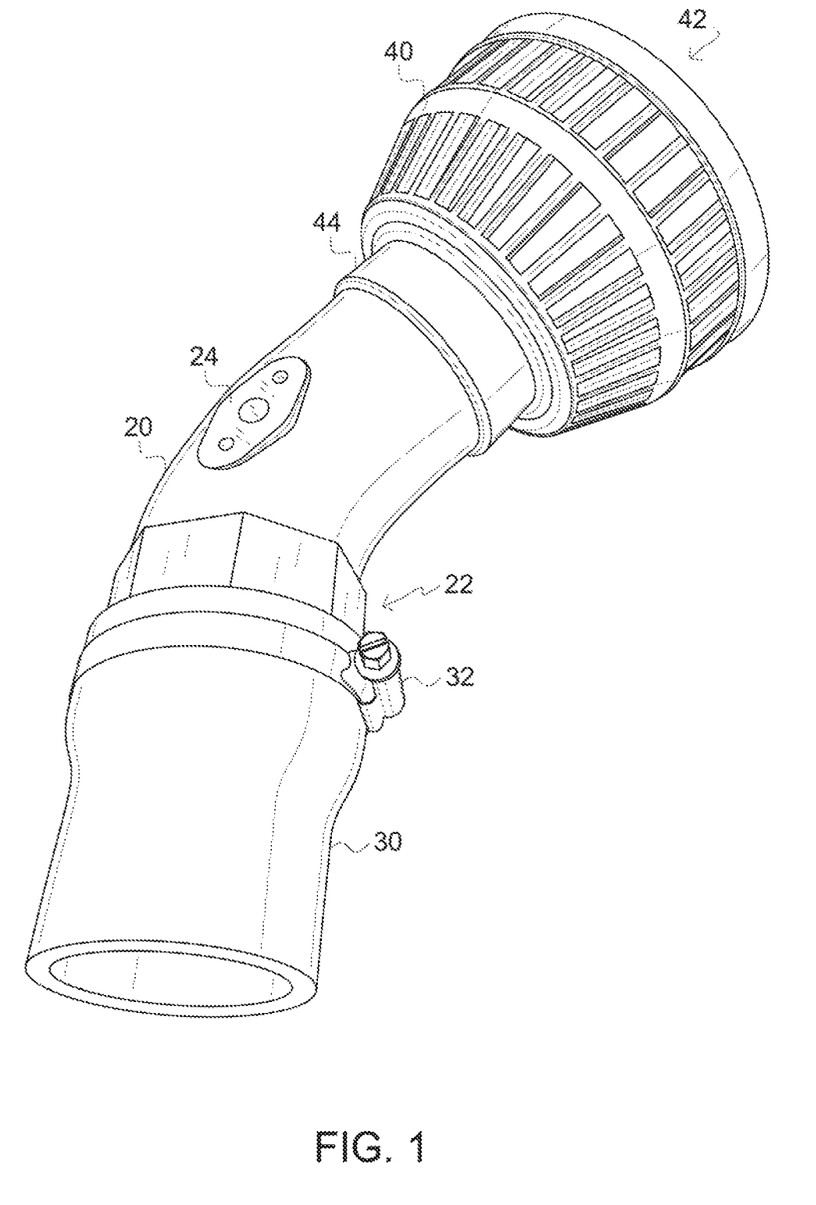
FIG. 1 is a side perspective view of a snow bike intake, according to one embodiment of the invention.
Figure 2:
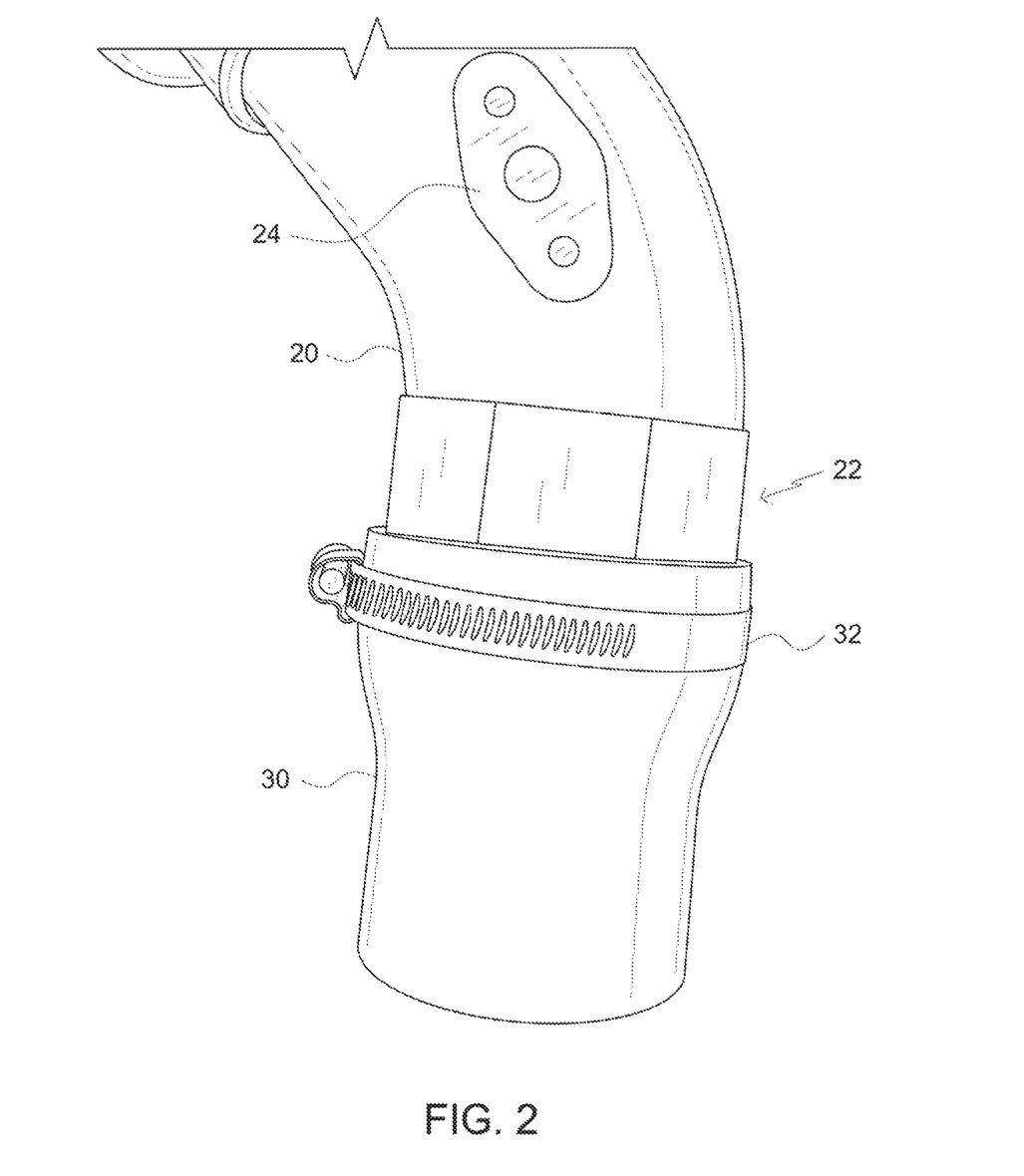
FIG. 2 is a partial side elevational view of a snow bike intake, according to one embodiment of the invention.
Figure 3:
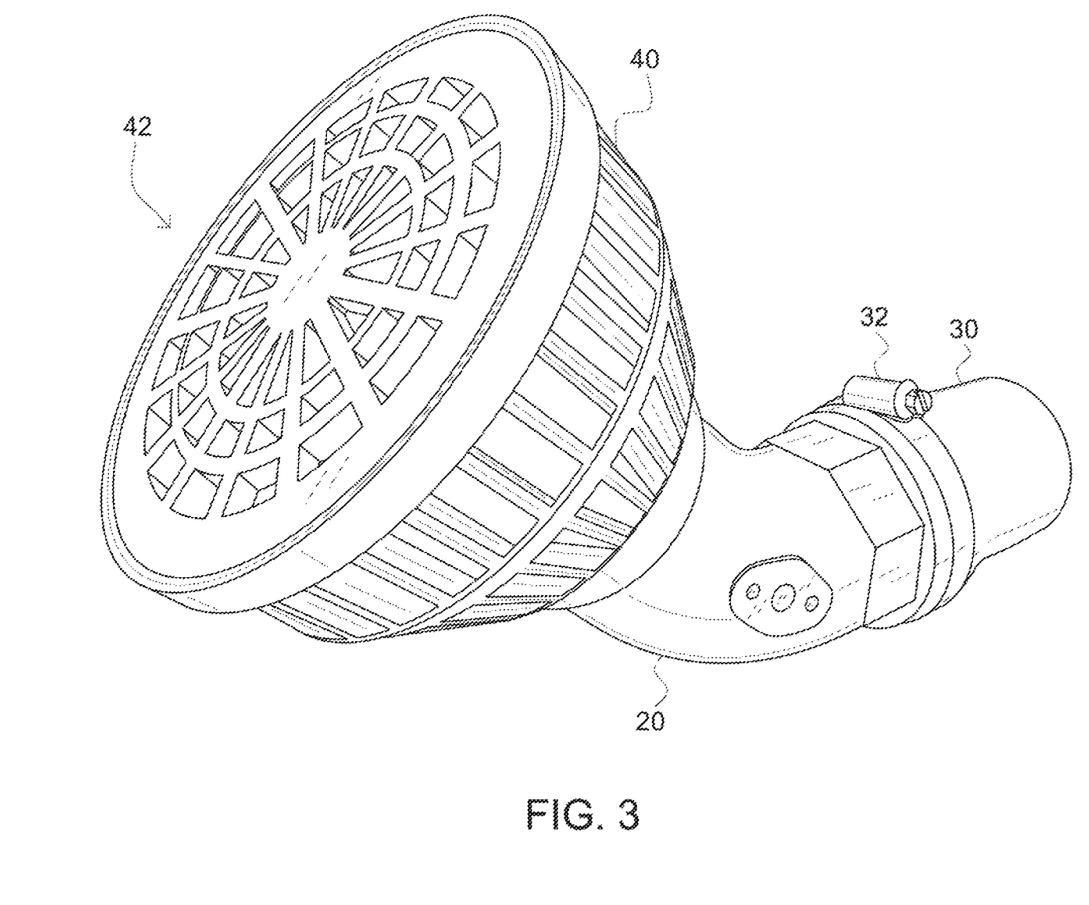
FIG. 3 is a top perspective view of a snow bike intake, according to one embodiment of the invention.

As illustrated, the throttle line 92 follows a line of the throttle body coupling (See e.g., FIG. 1, Item 30), while the illustrated intake line 93 follows a line of the intake duct (See e.g., FIG. 1, Item 20). The intersection of the throttle line 92 and the intake line 93 for the illustrated interior angle 94 and exterior angle 95. As shown, the interior angle 94 is acute and the exterior angle 95 is obtuse.

The illustrated throttle body length 96 follows a length and curvature of the throttle body coupling (See e.g., FIG. 1, Item 30). In addition, the illustrated duct length 97 follows a length and curvature of the intake duct (See e.g., FIG. 1, Item 20). Too, the illustrated duct plus cage length 98 follows a length and curvature of the intake duct (See e.g., FIG. 1, Item. 20) and a length and curvature of the prefilter body cage (See e.g., FIG. 1, item 40).

According to one embodiment, there is a snow bike intake, snow bike conversion kit, and/or air intake pod snow bike conversion kit, that includes one or more of the following: a throttle body coupling 30; a coupling device 32; an intake duct 20 that may be elbow-shaped and/or may be selectably coupleable to the throttle body coupling 30 via the coupling device 32, the duct 20 may have an interior angle between 40 and 60 degrees; a pre-filter body cage 40 that may be selectably coupleable at a rear thereof to the duct 20 via a mating structures disposed on the duct 20 and the cage 40; and/or a textile cover that may be shaped to fit about the cage 40 and selectably attach thereto.

It may be that the duct 20 includes a sensor mount 24 disposed through a body of the duct 20. It may be that the sensor mount 24 is flat on both the exterior and interior surfaces thereof. It may be that the sensor mount 24 is part of an array of sensor mounts 22 disposed in a ring circumscribing and extending through the body of the duct 20. It may be that the array of sensors 22 forms a continuous regular polygon about the perimeter of the duct 20.

It may be that the cage 40 includes a coupling collar with mating structures for coupling; to the duct 20. The duct 20 may also include mating structures. It may be that the mating structures are selected from the group of mating structures consisting of: threading, friction fittings, spring-locks, and locking-lug connectors.

It may be that the cage 40 has a flat front 42 opposite the rear. The cage 40 may have a flat front 42 that is substantially horizontal in profile. It may be that the flat front 42 of the cage 40 has a larger diameter than a diameter of the rear. Accordingly, the cage 40 may be substantially funnel-shaped and/or may funnel air.

It may be that the duct 20 has an aspect ratio of exterior angle length 97 to diameter 90 no greater than one or more of 2.5:1, 2.6:1, 2.7:1, 2.8:1, 2.9:1, 3.0:1, 3.1:1, 3.2:1, 3.3:1, 3.4:1, 3.5:1, 3.6:1, 3.7:1, 3.8:1, and 3.9:1. It has been observed that optimal airflow and protection from snow build-up within airboxes occurs at these aspect ratios. It may be that the duct 20 and prefilter 40 combined has an aspect ratio of exterior angle length 98 to diameter 91 no greater than 4.0:1, 4.1:1, 4.2:1, 4.3:1, 4.4:1, 4.5:1, 4.6:1, 4.7:1, 4.8:1, and 4.9.1. It has been observed that optimal airflow and protection from snow build-up within airboxes occurs at these aspect ratios.

In operation, a snow bike intake is installed on a dirt bike in order to convert the dirt bike into a snow bike. An array of sensor mounts 22 and a sensor mount 24 are disposed on an intake duct 20. A throttle body coupling 30 is coupled to one end portion of the intake duct 20 by inserting the intake duct 20 into the throttle body coupling 30 and tightening a coupling device 32. A prefilter body cage 40 is coupled to an end portion of the intake duct 20 opposite the throttle body coupling 30. The prefilter body cage 40 is coupled to the intake duct 20 by threading disposed along at an end portion of the duct 20 opposite the throttle body coupling 30, and by threading disposed along a coupling collar 44 of the prefilter body cage 40. The throttle body coupling 30 is coupled to a bike throttle at an end portion opposite the intake duct 20. The front of cage 42 of the prefilter body cage 40 prevents moisture from entering the intake duct 20. Accordingly, the intake duct 20 may be easily and simply installed on a snow bike.

Figure 5:
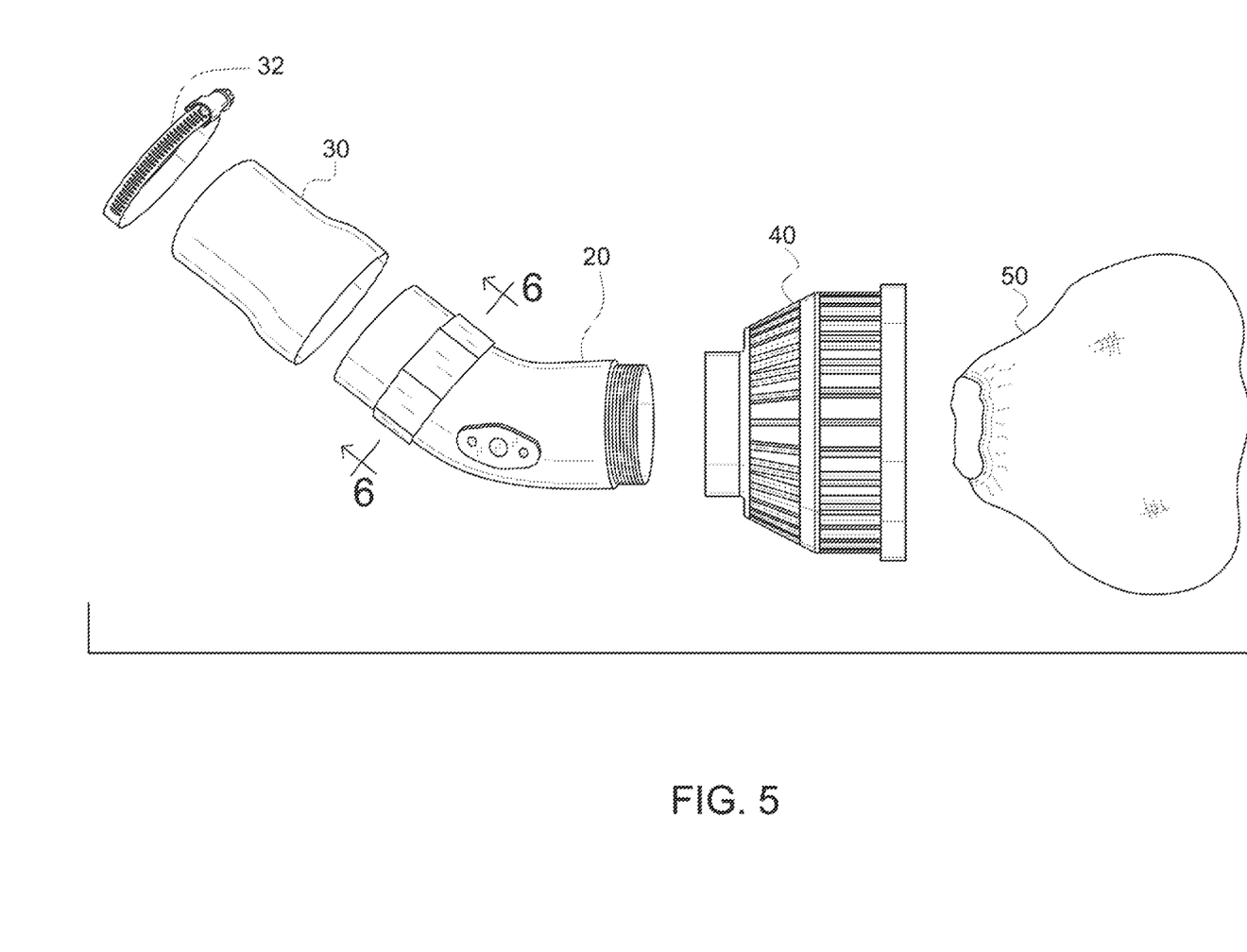
FIG. 5 is an exploded side perspective view of a snow bike conversion kit, according to one embodiment of the invention.

FIG. 5 is an exploded side perspective view of a snow bike conversion kit, according to one embodiment of the invention. There is shown an intake duct 20. The intake duct 20 may be coupled to a throttle body coupling 30 by a coupling device 32. The intake duct 20 may also be coupled to a prefilter body cage 40. A textile cover 50 may be coupled to the prefilter body cage 40.

The illustrated intake duct 20 is curved. The intake duct 20 may be coupled to the throttle body coupling 30 and the throttle body coupling 30 may couple to a throttle of a snow bike. The intake duct 20 may couple to the throttle body coupling 30 through a variety of coupling methods, such as, but not limited to: threading, adhesives, bolts, friction, tension, male and female components, snapping, pressing, spring-locks, locking-lug connectors, etc. As illustrated, the intake duct 20 may couple to the throttle body coupling 30 by the coupling device 32.

As illustrated, the coupling device 32 may be disposed around a circumference of the throttle body coupling 30. The coupling device 32, may be tightened by twisting a handle, such as a vice or a ring clamp. The coupling device 32 may include a bolt for tightening. As a result, a diameter of the coupling device 32 may be increased and decreased. For example, the diameter of the coupling device 32 may be decreased in order to couple the throttle body coupling 30 to the intake duct 20 by tension-fit.

The illustrated intake duct 20 may also be coupled to the prefilter her body cage 40. As shown, the intake duct 20 may couple to the prefilter body cage 40 by the illustrated threading. However, the intake duct 20 may couple to the prefilter body cage 40 through a variety of coupling methods, such as, but not limited to: adhesives, bolts, friction, tension, male and female components, snapping, pressing, spring-locks, locking-lug connectors, etc.

As illustrated, a textile cover 50 may be coupled to the prefilter body cage 40 cover the prefilter body cage 40. The textile cover 50 may be comprised of a variety of textiles, such as, but not limited to: cotton, linen, polyester, silk, rayon, etc. and combinations thereof. The textile cover 50 may also include an elastic portion for stretching over the prefilter body cage 40 and/or may include a draw cord or other securing structure to couple the mouth of the cover to the cage. As a result, the textile cover 50 may provide protection to, as well as provide additional/finer filtration for, the prefilter body cage 40.

Figure 6:
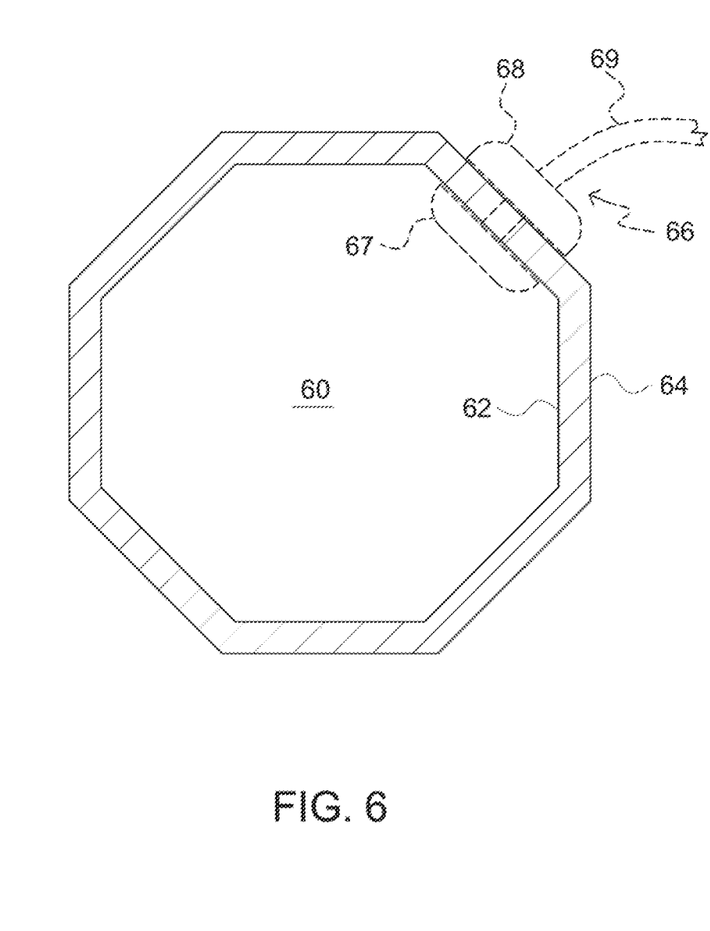
FIG. 6 is a cross-sectional view of the intake duct of FIG. 5, showing an array of sensor mounts, according to one embodiment of the invention.

FIG. 6 is a cross-sectional view of the intake duct of FIG. 5, showing an array of sensor mounts, according to one embodiment of the invention. There is shown an interior cavity 60 disposed substantially within an interior surface of sensor mount 62. Disposed opposite the interior surface of sensor mount 62 is an exterior surface of sensor mount 64. Disposed substantially through the interior surface of sensor mount 62 and the exterior surface of sensor mount 64 is a sensor 66. The illustrated sensor 66 has an interior plate 67 disposed substantially along the interior surface of sensor mount 62, and an exterior plate 68 disposed substantially along the exterior surface of sensor mount 64. The illustrated sensor 66 also has a sensor cord 69 coupled to the sensor 66 and extending outwardly therefrom, substantially away from the interior cavity 60.

The illustrated interior cavity 60 is disposed substantially within the interior surface of sensor mount 62. As shown, the interior cavity 60 is substantially octagonal. However, the interior cavity 60 may have any size and/or shape for mounting sensors 66, such as, but not limited to: octagonal, pentagonal, hexagonal, square, triangular, circular, etc.

As illustrated, a sensor 66 is disposed substantially through the interior surface of sensor mount 62 and the exterior surface of sensor mount 64. Accordingly, there may be any distance between the interior surface of sensor mount 62 and the exterior surface of sensor mount 64 for mounting sensors 66. As shown, the interior surface sensor mount 62 and the exterior surface sensor mount 64 are substantially flat. Similarly, the solitary sensor mount 24 may be flat on both the exterior and the interior of the duct.

The illustrated interior plate 67 is disposed substantially along the interior surface of sensor mount 62, and the illustrated exterior plate 68 is disposed substantially along the exterior surface of sensor mount 62. As shown, the interior plate 67 and the exterior plate 68 are substantially flat. The interior plate 67 and the exterior plate 68 provide coupling and stabilizing for the sensor to the sensor mounts (See e.g., FIG. 1, Items 22 and 24). As shown, a single sensor 66 is illustrated; however, a plurality of sensors/injectors 66, such as an array (See e.g., FIG. 1, Item 24) may be disposed about the intake duct (See e.g., FIG. 1, Item 20).

The illustrated sensor 66 includes a sensor cord 69. As shown, the sensor cord 69 is coupled to the sensor 66 and extends outwardly therefrom. The sensor cord 69 may gather external data, such as, but not limited to, atmospheric data, for the sensor 66. The sensor cord 69 may also assist in removal, of the sensor 66. As a result, the sensor cord may have any size and/or shape for collecting data and/or removal. Similarly, a variety of sensors 66 may be mounted about the intake duct (See e.g., FIG. 1, Item 20), such as, but not limited to: oxygen saturation sensors, condensation sensors, humidity sensors, temperature sensors, dew point sensors, and so on.

Figure 7:
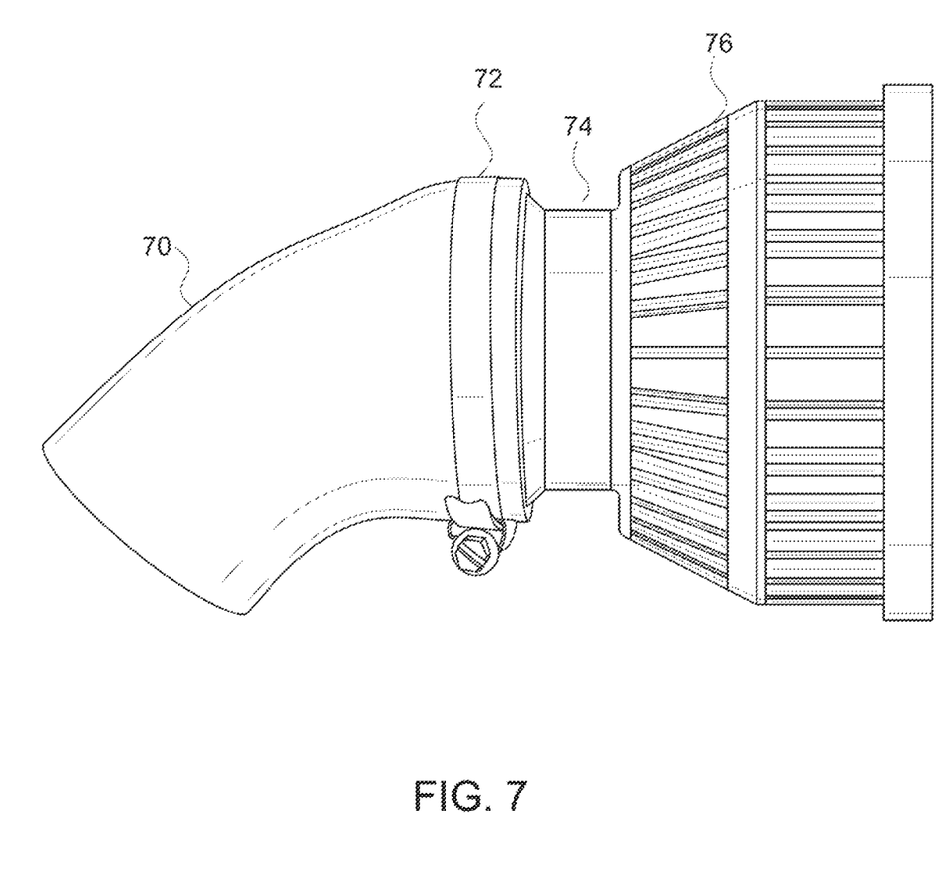
FIG. 7 is a side devotional view of a snow bike intake, according to one embodiment of the invention.

FIG. 7 is a side elevational view of a snow bike intake, according to one embodiment of the invention. There is shown a throttle body coupling 70 with a coupling device 72 disposed about the throttle body coupling 70. The throttle body coupling 70 is coupled to a coupling collar 74. Coupled to the coupling collar 74 at an end opposite the throttle body coupling 70 is a prefilter body cage 76.

The illustrated throttle body coupling 70 is elbow shaped. Accordingly, the illustrated throttle body coupling 70 is angular and bent. As a result, the throttle body coupling 70 provides a curve to the snow bike intake. Also, the illustrated throttle body coupling 70 includes a coupling device 72. As shown, the coupling device 72 couples the throttle body coupling 70 to the coupling collar 74. The coupling device 72 may couple the throttle body coupling 70 to the coupling collar 74 by tension. For example, in one non-limiting embodiment, the coupling device may be a ring clamp. However, the throttle body coupling 70 may couple to the coupling collar 74 through a variety of coupling methods, such as, but not limited to: adhesives, bolts, friction, tension, male and female components, snapping, pressing, spring-locks, locking-lug connectors, etc.

As illustrated, the coupling collar 74 is coupled to a prefilter body cage 76 at an end opposite the throttle body coupling 70. As shown, the coupling collar 74 has a length that is substantially small. Accordingly, the coupling collar 74 may be substantially compact. However, the coupling collar 74 may have any size/and or shape far coupling. Additionally, the coupling collar 74 may be inherent in the prefilter body cage 76 so that the coupling collar 74 and the prefilter body cage 76 are a single continuous piece. For instance, the coupling collar 74 may be an extension of the prefilter body cage 76.

Figure 8:
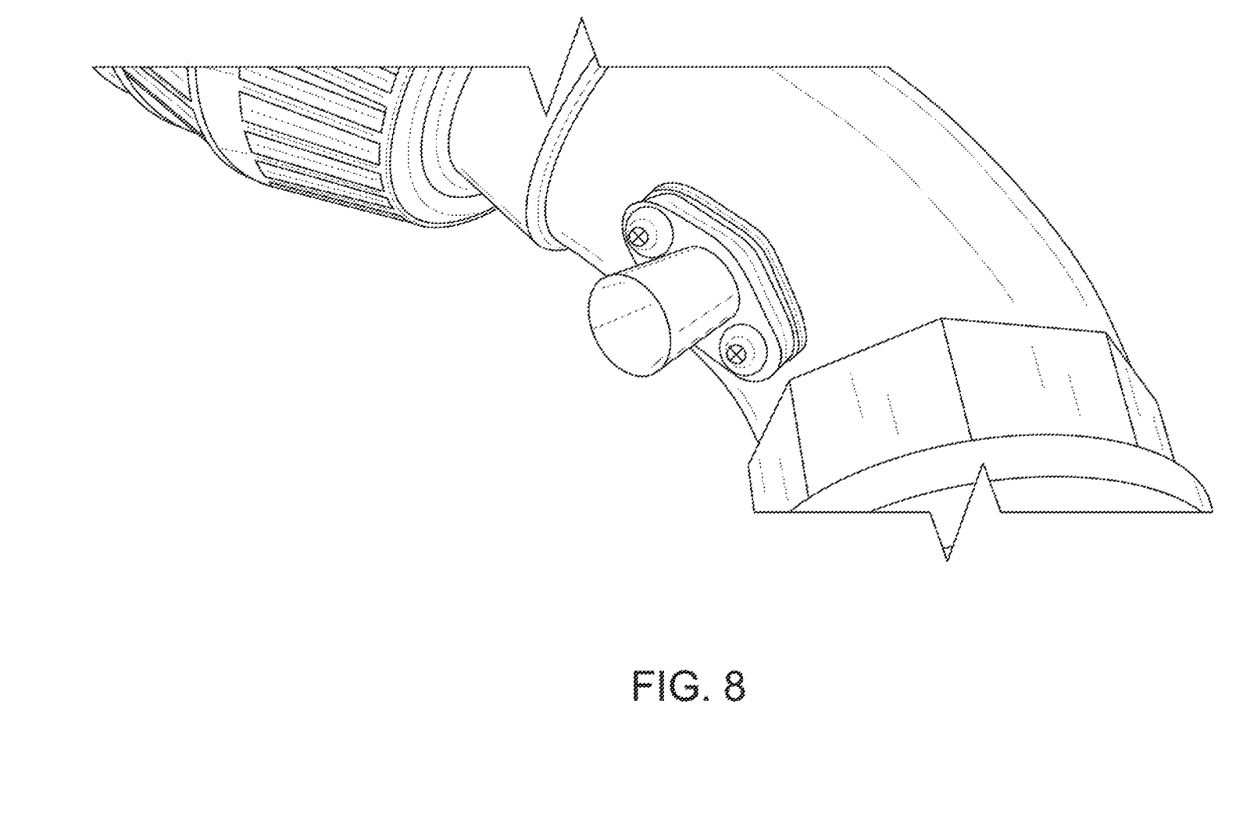
FIG. 8 is a partial side perspective view of an intake duct showing a sensor coupled to a sensor mount, according to one embodiment of the invention.

FIG. 8 is a partial side perspective view of an intake duct showing a sensor coupled to a sensor mount, according to one embodiment of the invention. There is shown an intake duct. A sensor mount is coupled to the intake duct and a sensor is coupled to the sensor mount.

The illustrated intake duct includes a sensor mount coupled to the intake duct. As shown, the sensor mount is coupled to a side portion of the intake duct. In addition, the sensor mount is coupled substantially near a bend of the intake duct. The sensor mount may have any size and/or shape for mounting a sensor. More, the intake duct may include any number of sensor mounts, coupled to the intake duct at various locations, for mounting sensors.

As illustrated, a sensor is coupled to the sensor mount. The sensor may sense a variety of factors and/or provide information to the intake duct. For example, the sensor may detect moisture.

Figure 9:
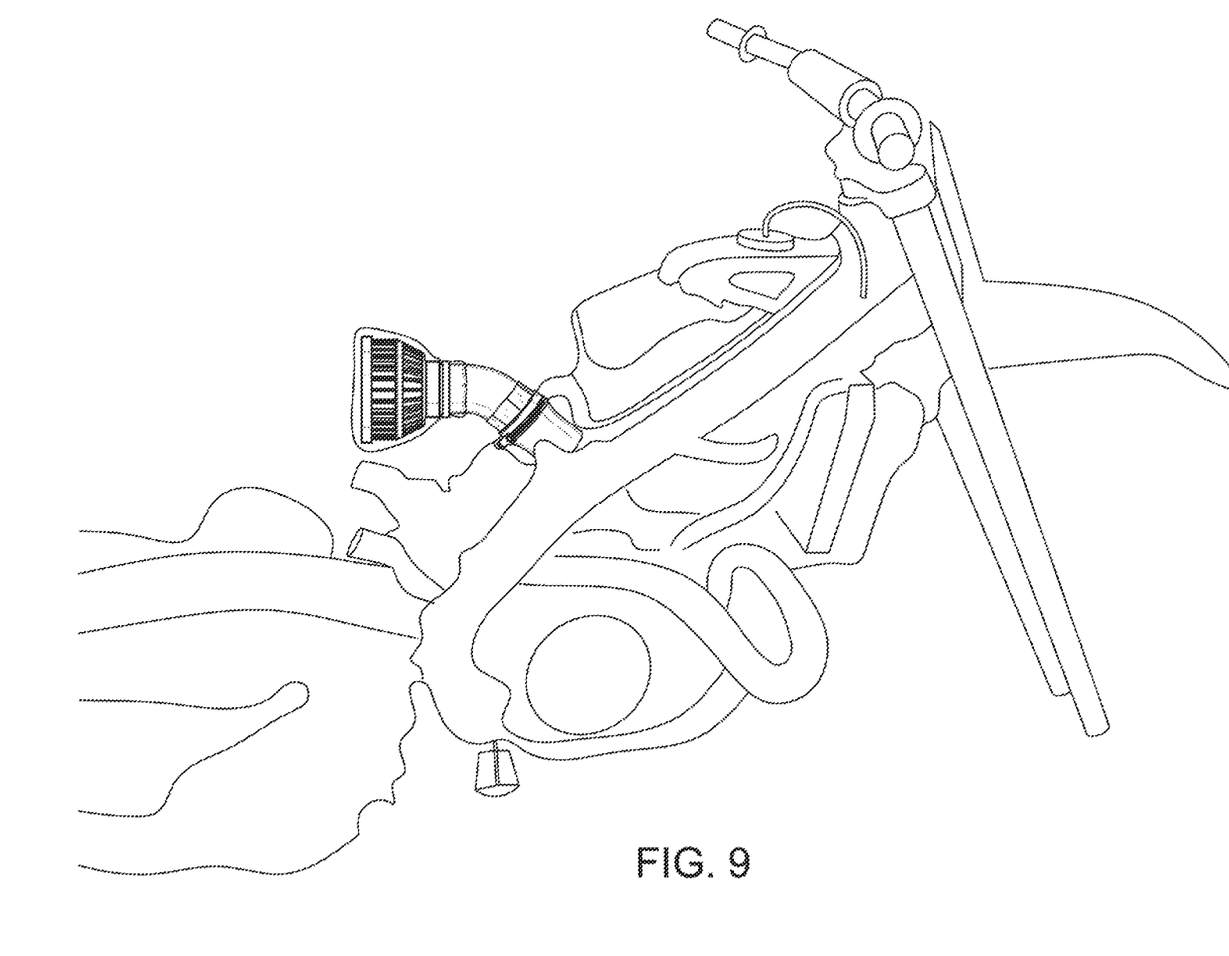
FIG. 9 is a side elevational view of a partially dismantled dirt bike showing an intake duct coupled to a throttle body, according to one embodiment of the invention.

FIG. 9 is a partial side devotional view of a partially dismantled dirt bike showing an intake duct coupled to a throttle body, according to one embodiment of the invention. There is shown an intake duct coupled to the bike near the throttle. The illustrated intake duct includes a prefilter body cage.

As shown, the intake duct is coupled to the bike and extends outwardly therefrom. The intake duct is elbow-shaped is substantially curved. The prefilter body cage is coupled to the intake duct opposite the bike. As a result, the intake duct may prevent moisture from entering the throttle.

Figure 10:
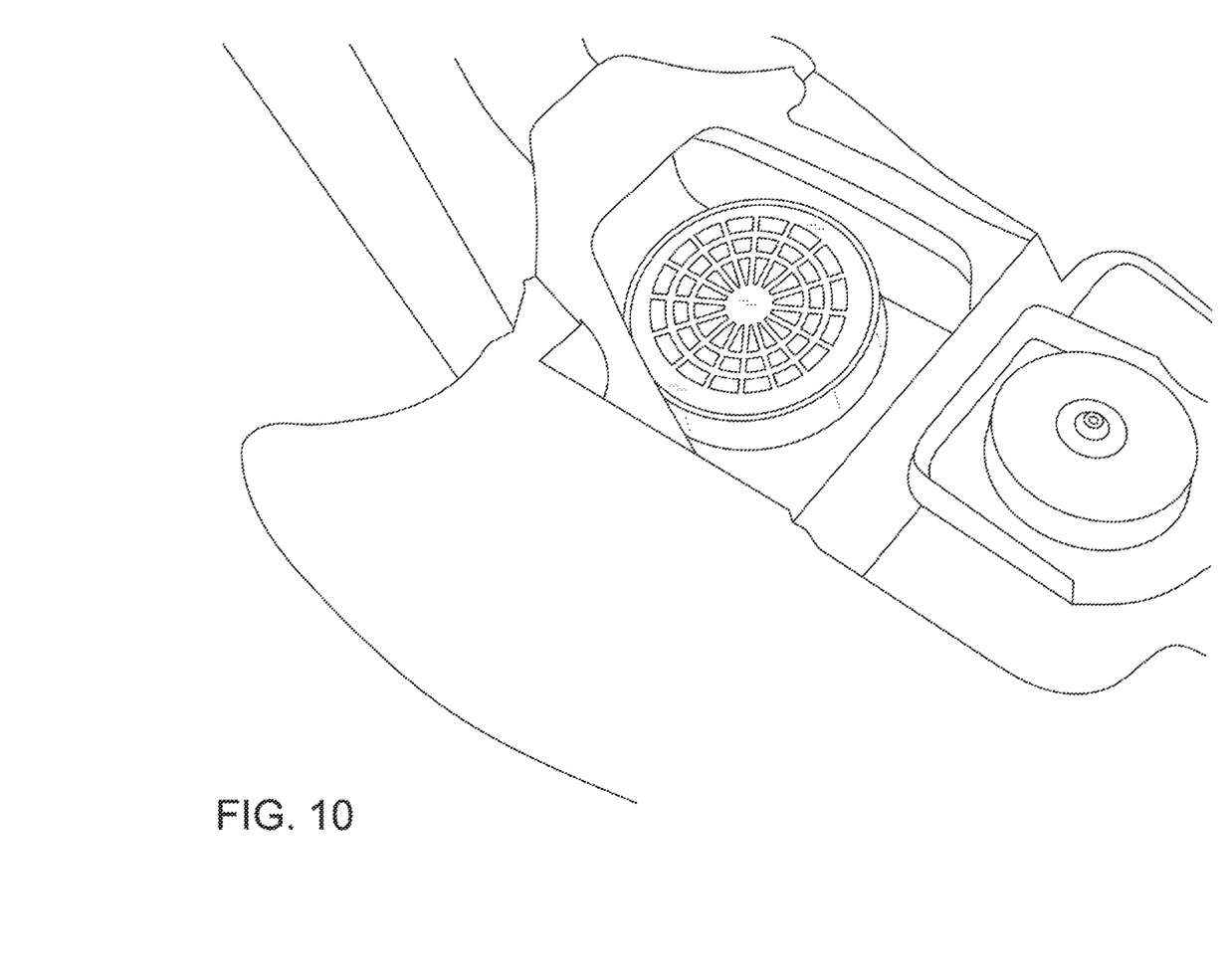
FIG. 10 is a top perspective view of an open air box of a dirt bike showing a snow bike intake disposed therein, according to one embodiment of the invention.

FIG. 10 is a top perspective view of an open an box of a dirt bike showing a snow bike intake therein, according to one embodiment of the invention. There is shown a prefilter body cage disposed substantially within a sensor box of the bike. In the illustrated view, the remainder of the snow bike intake is obscured by the flared cage. The sensor box includes a cover that may be disposed over the sensor box and cover the prefilter body cage.

The illustrated prefilter body cage has a flat front of cage. Accordingly, the prefilter body cage may be entirely disposed within the sensor box. Also, the flat front of cage may allow the cover to be disposed over the sensor box so that the entire prefilter body cage is covered when the sensor box is closed.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the mounting points are configured to mount sensors, a variety of accessories may be mounted to the mounting points. Also, the intake duct may have any number of mounting points. Further, the mounting points may have any size, shape, or arrangement for mounting.

Additionally, although the figures illustrate a ring clamp and threading for coupling, a variety of coupling methods may be used, such as, but not limited to: adhesives, bolts, friction, tension, male and female components, snapping, pressing, spring-locks, locking-lug connectors, etc.

It is expected that there could be numerous variations of the design of this invention. An example is that the intake duct may have a simple design. For example, the intake duet may be short or compact. Likewise, the intake duct may be an extension of the prefilter body cage. More, the intake duct may be a pod for air intake.

It is also envisioned that the components of the device may have any size and/or shape for air intake. For instance, the prefilter body cage may flare out. Similarly, the front of cage may be substantially flat.

Finally, it is envisioned that the components of the device may be constructed of a variety of materials, such as, but not limited to: plastic, metal, rubber, textiles, etc. and combinations thereof.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A snow bike intake, comprising:
   a. a throttle body coupling;
   b. an elbow-shaped intake duct coupled to the throttle body coupling, the duct having an interior angle between 40 and 60 degrees and including a sensor mount disposed through a body of the duct, wherein the sensor mount is not separable from the intake duct and is flat on both the exterior and interior surfaces of the duct, and wherein the flat interior surface of the sensor mount is coextensive to an innermost surface of the duct and is exposed to an interior duct cavity; and
   c. a pre-filter body coupled to the duct opposite the throttle body coupling.

2. The intake of claim 1, wherein the sensor mount is part of an array of sensor mounts disposed in a ring circumscribing and extending through the body of the duct.

3. The intake of claim 2, wherein the array of sensors forms a continuous regular polygon about the perimeter of the duct.

4. The intake of claim 1, wherein the pre-filter body is a cage structure having a flat front opposite the duct that is wider than the diameter of the duct.

5. The intake of claim 1, wherein the duct has an aspect ratio of exterior angle length to diameter no greater than 3.5:1.

6. The intake of claim 5, wherein the duct and prefilter combined has an aspect ratio of exterior angle length to diameter no greater than 4.5:1.

7. The intake of claim 1, wherein the prefilter body is a flared cage.

8. The intake of claim 7, further comprising a pre-filter cowl coupled about the pre-filter.

9. A snow bike conversion kit, comprising:
   a. a throttle body coupling;
   b. a coupling device;
   c. an elbow-shaped intake duct selectably coupleable to the throttle body coupling via the coupling device, the duct having an interior angle between 40 and 60 degrees;
   d. a sensor mount disposed through a body of the duct and is flat on both the exterior and interior surfaces of the duct, wherein a flat interior surface of the sensor mount is coextensive to an innermost surface of the duct and is exposed to an interior duct cavity;
   e. a pre-filter body cage selectably coupleable at a rear thereof to the duct via a mating structures disposed on the duct and the cage; and
   f. a textile cover shaped to fit about the cage and selectably attach thereto.

10. The lit of claim 9, wherein the sensor mount is not separable from the intake duct.

11. The kit of claim 10, wherein the sensor mount is part of an array of sensor mounts disposed in a ring circumscribing and extending through the body of the duct.

12. The intake of claim 11, wherein the array of sensors forms a continuos regular polygon about the perimeter of the duct.

13. The intake of claim 12, wherein the mating structures are selected from the group of mating structures consisting of: threading, friction fittings, spring-locks, and locking-lug connectors.

14. The intake of claim 13, wherein the cage has a flat front opposite the rear.

15. The intake of claim 14, wherein the flat front of the cage has a larger diameter than a diameter of the rear.

16. The intake of claim 15, wherein the duct has an aspect ratio of exterior angle length to diameter no greater than 3.5:1.

17. The intake of claim 16, wherein the duct and prefilter combined has an aspect ratio of exterior angle length to diameter no greater than 4.5:1.

18. An air intake pod, comprising:
   a. a throttle body coupling;
   b. an elbow-shaped intake duct coupled to the throttle body coupling, the duct having an interior angle between 40 and 60 degrees and including a sensor mount disposed through a body of the duct, wherein the sensor mount is integral with the intake duct and includes a flat interior surface interior to the duct as well as a flat exterior surface exterior to the duct, and wherein the flat interior surface of the sensor mount is coextensive to an innermost surface of the duct and is exposed to an interior duct cavity; and c. a pre-filter body coupled to the duct opposite the throttle body coupling.

19. The pod of claim 18, wherein the duct has an aspect ratio of exterior angle length to diameter no greater than 3.5:1 and wherein the sensor mount is part of an array of sensor mounts disposed in a ring circumscribing and extending through the body of the duct.

20. The pod of claim 19, wherein the pre-filter body is a cage structure having a flat front opposite the duct that is wider than a diameter of the duct and wherein the duct and prefilter body combined has an aspect ration of exterior angle length to diameter no greater than 4.5:1.

* * * * *